(12) United States Patent
Cacace

(10) Patent No.: US 9,005,767 B2
(45) Date of Patent: Apr. 14, 2015

(54) CORROSION RESISTANT METAL PRODUCTS

(75) Inventor: Antonino Giorgio Cacace, West Glamorgan (GB)

(73) Assignee: Cladinox International Limited, Seychelles (AU)

( * ) Notice: Subject to any disclaimer, the term of this patent is extended or adjusted under 35 U.S.C. 154(b) by 312 days.

(21) Appl. No.: 13/501,937

(22) PCT Filed: Oct. 19, 2010

(86) PCT No.: PCT/GB2010/001934
§ 371 (c)(1),
(2), (4) Date: Apr. 13, 2012

(87) PCT Pub. No.: WO2011/048364
PCT Pub. Date: Apr. 28, 2011

(65) Prior Publication Data
US 2012/0202088 A1 Aug. 9, 2012

(30) Foreign Application Priority Data

Oct. 22, 2009 (AU) ................................ 2009905130
Oct. 22, 2009 (AU) ................................ 2009905132

(51) Int. Cl.
*B32B 15/18* (2006.01)
*B23K 31/00* (2006.01)
(Continued)

(52) U.S. Cl.
CPC ....... *B32B 15/011* (2013.01); *Y10T 428/12778* (2015.01); *Y10T 428/12222* (2015.01); *B32B 15/01* (2013.01); *C21D 8/06* (2013.01); *C21D 2251/00* (2013.01); *C21D 2251/02* (2013.01); *C22C 9/06* (2013.01); *Y10S 428/933* (2013.01)

(58) Field of Classification Search
None
See application file for complete search history.

(56) References Cited

U.S. PATENT DOCUMENTS 3,466,734 A * 9/1969 Vordahl ......................... 228/118
3,574,569 A * 4/1971 Vordahl ......................... 428/588
(Continued)

FOREIGN PATENT DOCUMENTS

CN        1325667       7/2007
CN       201129616     10/2008
(Continued)

OTHER PUBLICATIONS

International Search Report, PCT/GB2010/001934, Feb. 9, 2011.
(Continued)

*Primary Examiner* — John J Zimmerman
(74) *Attorney, Agent, or Firm* — Young & Thompson

(57) ABSTRACT

A billet includes a solid steel body and an alloy cladding. The cladding may include a square tube in which the body is inserted with an interface at which the cladding becomes bonded to the body when the billet is heated and rolled or otherwise worked into a ferrous product. At least one element composed of a mass of finely divided scavenging aluminum, titanium or magnesium, is placed in the tube adjacent the body and separate from the interface. The elements are advantageously compressed into briquettes which scavenge oxygen from residual air at the interface to prevent oxidation of the cladding at the interface. The tube may be closed to prevent gases outside the billet from penetrating to the interface. Alternatively, reliance may be placed on the briquettes to scavenge oxygen from the residual air and also from atmospheric air and furnace gases before they can penetrate to the interface.

23 Claims, 5 Drawing Sheets

Figure 1:
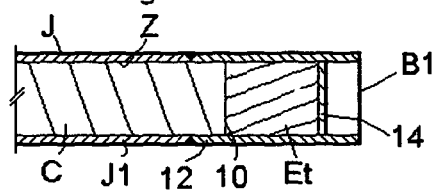

(51) Int. Cl.
  *B32B 15/01* (2006.01)
  *C21D 8/06* (2006.01)
  *C22C 9/06* (2006.01)

(56) References Cited

U.S. PATENT DOCUMENTS

| | | | |
|---|---|---|---|
| 3,627,521 A * | 12/1971 | Vordahl | 419/30 |
| 3,714,701 A | 2/1973 | Dion et al. | |
| 3,762,025 A | 10/1973 | Gottlieb et al. | |
| 3,762,995 A * | 10/1973 | Gulbransen et al. | 313/548 |
| 3,774,289 A | 11/1973 | Cacace et al. | |
| 3,904,378 A | 9/1975 | Higbee et al. | |
| 4,103,076 A | 7/1978 | Ulam | |
| 4,162,758 A | 7/1979 | Mikarai | |
| 4,784,922 A | 11/1988 | Yoshimura | |
| 4,831,708 A | 5/1989 | Yoshiwara et al. | |
| 5,051,315 A | 9/1991 | Cacace | |
| 5,088,399 A | 2/1992 | Cacace et al. | |
| 5,093,209 A | 3/1992 | Kroisenbrunner | |
| 5,124,214 A | 6/1992 | Cacace | |
| 5,676,775 A | 10/1997 | Cacace et al. | |
| 6,663,984 B2 | 12/2003 | Vostrikov | |
| 6,706,416 B1 | 3/2004 | Cacace | |
| 2014/0037979 A1 * | 2/2014 | Cacace | 428/577 |

FOREIGN PATENT DOCUMENTS

| | | |
|---|---|---|
| EP | 0 225 983 | 6/1987 |
| GB | 631584 | 11/1949 |
| GB | 1376328 | 12/1974 |
| GB | 2 085 330 | 4/1982 |
| GB | 0 059 070 | 9/1982 |
| JP | 63-126602 | 5/1988 |
| JP | 1-178384 | 7/1989 |
| RU | 2122930 | 12/1998 |
| RU | 2152858 | 7/2000 |

OTHER PUBLICATIONS

W.A.H. Poppmeier et al., The manufacture of stainless clad steels, Journal of the South African Institute of Mining and Metallurgy, Dec. 1991, pp. 435-439, vol. 91, No. 12.

S. Missori et al., Microstructural Characterization of a Stainless-Cladded Carbon Steel, Metallurgical Science and Technology, pp. 21-24.

Future Steel: Double or Even Triple the Life of Your Next Project, Introducing SMI 316 SC™ Stainless-Clad Reinforcing Steel, SMI Commercial Metals Process.

Stainless Steel World, Colclad, one page.

A. Nobili, Stainless Steel Explosion Clad Plates, The Safety Clads, Stainless Steel World, Jan./Feb. 1998, pp. 33-37.

Stainless Steel World, Meeting Point for Materials Professionals, Jan./Feb. 2001 KLAD—Magazine—Stainless Steel World, May 10, 2002, http://www.stainless-steel-world.net/cstories/Klad/3.asp, 3 pages.

Hot bond stainless-clad carbon steel shapes, Nickel, Dec. 1991, p. 11.

* cited by examiner

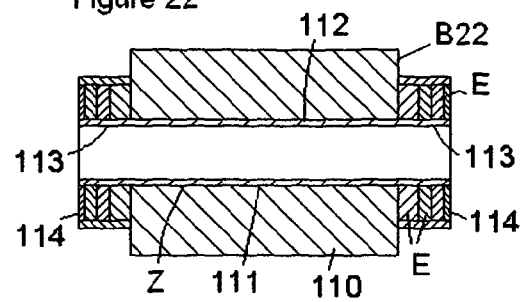
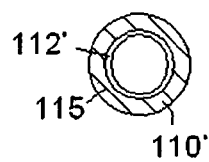
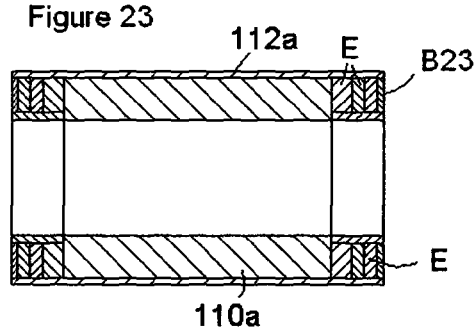
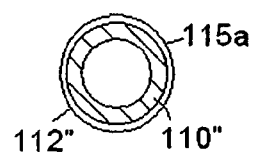
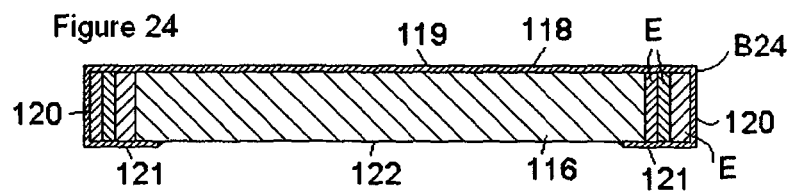
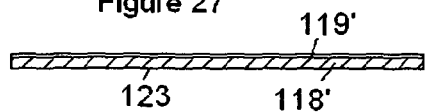

CORROSION RESISTANT METAL PRODUCTS

FIELD OF THE INVENTION

This invention relates to a process for the manufacture of corrosion resistant metal products and to products produced from the process. The invention has particular but not exclusive application to products comprising a body of corrosion susceptible steel bonded to a cladding comprised of stainless steel, or nickel-chrome alloy, or nickel-copper alloy or copper-nickel alloy.

DESCRIPTION OF THE RELATED ART

The susceptibility to corrosion of what are commonly simply called "steels" that are most often used in industry should not require further discussion. Conversely, the corrosion resistant properties of stainless steels and the aforementioned alloys are equally well known. This invention applies, in principle, to any product that is composed of a body of steel that is significantly more susceptible to corrosion than stainless steel or the aforementioned alloys and that is susceptible of having applied to it a cladding of these materials by the techniques described herein. In this specification, the term "steel" used by itself will refer to such a steel unless it is clear from the context that this is not intended. In particular, it is intended that the term "steel" should cover what are commonly called carbon steels. According to convention, and as used herein, the term "carbon steels" covers various grades of carbon steel, including mild steels, low alloy engineering steels and micro-alloy steels.

The terms "stainless steel", "nickel-chrome alloy" and "nickel-copper alloy" are names that are well known in the metal industry and are generally applied to a range of alloys containing, respectively, significant amounts of chrome, nickel and chrome, and copper and nickel. In nickel-copper alloys there is more nickel than copper, in contrast to "copper-nickel alloys" in which the proportions of nickel and copper are reversed. Ranges of alloys under each of the four names appear in lists available from the major producers thereof including Outokumpu, Allegheny Ludlum, Special Metals Corporation (owners of the trade marks Monel for nickel-copper alloys and Inconel for nickel-chrome alloys), Haynes International Inc (owners of the trade mark Hastelloy for nickel-chrome alloys) and Columbia Metals Ltd. Furthermore the alloys in each range are covered by standards issued under the names of the respective alloys and set up by international standards bodies such as ASTM (American Society for Testing Materials) and JSA (Japanese Standards Association) and material classification systems such as UNS (Unified Numbering System). As will become clear, an essential aspect of the invention is the provision of means to avoid oxidation of the named metals in the respective alloys when they are heated in the course of producing ferrous products that are clad with the alloys. As used herein, the three terms are intended to cover such of these alloys in which oxidation of the named metals is avoided or at least reduced in the course of production of such ferrous products according to the techniques of the present invention. For avoidance of doubt, it is intended that the alloys to which this invention applies include, but are not limited to:

Stainless steel: austenitics including ASTM A304 (UNS S30400), ASTM 316 (UNS S31600), ASTM XM-29 (UNS S24000), ASTM XM-28 (UNS S24100); duplexes including UNS S32101, S32304, S32205, S32760 and 32750.

Nickel-chrome alloys: ASTM B637 (UNS N06002) and ASTM B564 (UNS N10276)

Nickel-copper alloys: ASTM B865 (UNS N05500) and ASTM B166 UNS N06600)

Copper-nickel alloys: UNS C70600 and UNS C71500

In this specification, the following abbreviations are used in order to avoid excessive repetition:

SS=stainless steel
NiCr=nickel-chrome
NiCu=nickel-copper
CuNi=copper-nickel
RT=Starting Rolling Temperature Range
RTa=RT for: austenitic SS/NiCr: 1230-1280° C.
RTd=RT for: duplex/ferritic SS/NiCu/CuNi: 1100-1200° C.
FD="finely divided" in the sense defined below.

BACKGROUND OF THE INVENTION

In discussing the background of the invention, it is useful to refer to a series of inventions covered by patents applied for by Cacace et al. These patents and the processes described therein are referred to herein as the "earlier Cacace" patents and processes. The most recent of these appears to be the family of patents that include U.S. Pat. No. 6,706,416.

The earlier Cacace patents deal essentially with the production of long products such as reinforcing bars (hereinafter referred to as "rebars") comprising a core of mild steel and having a stainless steel cladding. These rebars are produced from billets comprised of a stainless steel jacket filled with briquettes of mild steel swarf. The billets can be heated and rolled into finished rebars having the desirable properties and low cost of mild steel but which have a stainless steel cladding for substantially increased corrosion resistance. On perusal of these patents it is clear that the achievement of a satisfactory metallurgical bond at the interface between the stainless steel cladding and the steel core has been problematical. The root of the problem is the occurrence of oxidation at elevated temperatures of the chrome in the stainless steel at the interface. There are several potential sources of the oxygen that causes this oxidation. One source is the residual oxygen in the air that remains in the briquettes and in the jacket after the billet is formed. A second source is atmospheric oxygen that enters the billet through its ends, particularly after the billet is heated. This can happen when the billet cools after it is removed from the furnace, causing the gas pressure inside the billet to drop below atmospheric pressure. It can also happen as the billet is heated due to the thermal gradient between the core and the much hotter cladding. As a result, a gap develops between the core and the cladding and this is further exacerbated by the thermal expansion of the stainless steel, which is greater than that of mild steel. A third potential source of oxygen is the residual oxidation (rust) that is present on the surface of the particles of mild steel swarf that make up the briquettes. In the absence of preventive measures, this oxidation reacts with carbon that, as the temperature increases, diffuses out of the mild steel to form CO (carbon monoxide) and/or $CO_2$ (carbon dioxide). Both CO and $CO_2$ can cause significant oxidation of the stainless steel at elevated temperatures.

In the process described in U.S. Pat. No. 6,706,416 this problem has been addressed by the use of dual additives which are mixed with the swarf particles before the briquettes are formed. The working examples of the first of these additives are powdered ammonium chloride ($NH_4Cl$) and urea. When the billet is heated, these evidently break down into gaseous form at a temperature below which the oxidation of the stainless steel is significant. These gases are under pressure in the hot interior of the billet and act to displace the residual oxygen. This first step is employed in conjunction with the action of the second additive. This second additive, the working example of which is aluminium, becomes increasingly reactive as the temperature increases above that at which the ammonium chloride or urea has completely broken down. The aluminium reacts with oxygen in the rust to form aluminium oxide and also with any oxygen that enters the billet from the atmosphere, thus preventing oxidation of the chrome.

In U.S. Pat. No. 6,706,416 it is stated that "both $NH_4Cl$ and urea generate considerable volumes of reducing gases in the temperature range from 200° C. up to about 500° C.". A similar statement appears in U.S. Pat. No. 5,676,775 in which the use of a single additive such as $NH_4Cl$ and urea is suggested. These statements are inaccurate insofar as they suggest that $NH_4Cl$ and urea generate gases that reduce Cr oxides in the billet. In fact the named agents evolve nitrogen ($N_2$), hydrogen ($H_2$) and chlorine ($Cl_2$). The Ellingham diagram for the reaction of metals to form oxides indicates that these substances should not be reducing to Cr oxides in the conditions existing in the billet. The applicant now believes that it is more likely that their evolution creates a positive gas pressure in the billet. The gases are thus carried out of the billet and, in the process, drive residual air out of the billet. So, from a temperature well below 500° C., the quantity of residual atmospheric oxygen in the billet would diminish until it is probably close to zero. The remaining sources of oxygen in the billet would be the iron oxide on the surface of the swarf and air that enters through the ends of the billet after the $NH_4Cl$ and urea are spent.

As stated in U.S. Pat. No. 6,706,416, the iron oxide from the swarf combines with carbon derived from the mild steel swarf to form, first $CO_2$ and then, at higher temperatures, CO. This process starts to take place on a significant scale at quite a low temperature, perhaps 300° C. $CO_2$ is oxidising to Cr and, contrary to what is stated in U.S. Pat. No. 6,706,416, the Ellingham diagram shows that CO should be reducing to Cr oxides only above about 1225° C. Temperatures in the billet at the interface between the core and jacket may not always uniformly exceed this transition temperature because it is very close to the temperatures (1260-1280° C.) at which billets clad with austenitic SS normally exit the furnace. This could be due to temperature variations inside the billet or because the soaking times in the furnace are insufficient. The reducing reaction of CO may therefore not always be strong enough to bring about complete reduction, resulting in a micrographically visible layer of Cr oxides dispersed about the surface of the SS. A more concentrated, or even continuous, oxide layer would occur if the transition temperature is not reached at all, resulting in even less bonding at the interface and possibly product failure.

In U.S. Pat. No. 6,706,416, aluminium, the second metal that is added to the billet, is therefore relied on to ensure the reduction or prevention of Cr oxides as the temperature rises after the $NH_4Cl$ or urea are spent.

Having regard to the disclosures in the earlier patents, it is clear that, in the processes described therein, each reducing agent on its own is insufficient to prevent the formation of Cr oxides that impede subsequent bonding of the SS jacket to the core.

It also seems clear that, for an open ended billet comprised of granulated mild steel briquettes, as used in the earlier process, it is essential that both additives, i.e. $NH_4Cl$ or urea, and aluminium should be well dispersed through the granules. In any case, it may be concluded that, for an adequate bond between the SS jacket and the carbon steel core, it is necessary is to avoid, as far as possible, the formation of Cr oxides at the interface from the commencement of heating until the jacket becomes bonded to the core.

There are significant potential disadvantages to using swarf as a feedstock for the core in the earlier process described above.

In a full scale manufacturing operation, it may be difficult to maintain a reliable source of swarf of a particular grade in a situation in which it is necessary that the end product comply with an international standard and specification.

Furthermore, it is self-evident that costly specialised machinery, some of which is described in U.S. Pat. No. 5,088,399, is required for preparing the swarf and the billets in the earlier process. In addition, because of their furnace design, most established rolling mills cannot roll from round billets. It is not easy to envisage machinery that will be capable of producing billets that comprise compressed swarf and have a cross sectional shape that is not round. Further, the size, and especially the length, of the billets, at least those described in the earlier patents, is quite small. There are only a limited number of existing rolling mills that are able to roll billets of such short length and even fewer that can also roll from a round billet. This is partly because existing furnaces are of the pusher type designed for handling square billets. Round billets require furnaces of the walking beam type. The use of small billets is likely to result in the rolling process being inefficient because modern rolling mills are designed to roll ever-longer billets to enhance productivity. Although in principle the size and length of billets that comprise compressed swarf could be increased, and the shape changed, the technical problems involved in achieving suitable machinery for this purpose might well be insuperable.

Another problem inherent in the earlier process described above, again self evident, is that the gases evolved by the $NH_4Cl$ and urea must necessarily be vented. Apparently the billet is open-ended for this reason. This is stated in U.S. Pat. No. 5,124,214, notwithstanding that it suggests the use of a cap to enclose the ends of the billet. However, this patent is dated prior to the use of any additives as described above. Furthermore, although this patent also contains a suggestion that the tube can be sealed by applying a graphite paste to the ends of the core, this would be unworkable.

The paste would rapidly become friable and porous with the moisture in the paste rapidly being driven off. This would cause the graphite to collapse and therefore no longer form the barrier intended. Moreover, the graphite would react with the steel in the briquettes at a temperature of about 1000° C., effectively forming molten cast iron and would be completely ineffective in reducing Cr oxides.

U.S. Pat. No. 5,676,775 discloses only an open-ended billet. In U.S. Pat. No. 6,706,416, an experimental billet is disclosed which contains only aluminium as an additive. Although this billet is described as closed, it is provided at each end with a vent hole to allow gases to escape from the billet. The vent holes were welded closed after the billet was removed from the furnace. Having regard to what has been said above, the applicant believes that that these vent holes would not prevent residual atmospheric oxygen causing oxidation of Cr in the billet at lower temperatures, before the aluminium additive becomes active.

One object of the invention is to provide a billet comprising a solid steel body and a cladding composed of stainless steel, or a nickel-chrome, nickel-copper or copper-nickel alloy in which oxidation which interferes with the bond between the cladding and the steel body in the finished product is reduced, at least to the extent of providing a commercially acceptable finished product.

STATEMENTS OF SUMMARY OF THE INVENTION

In this specification the term "scavenge" implies the removal of gaseous oxygen, as opposed to "reduction" which implies the removal of oxygen from a compound that contains oxygen as one of its components.

According to the invention, there is provided a billet comprising a body of solid steel, a cladding member that is comprised of an alloy selected from the group comprising stainless steel, nickel-chrome, nickel-copper and copper-nickel alloys and that is positioned so that there is an interface between the body and the cladding member at which the cladding member and the body become bonded together when the billet is heated and worked to form a ferrous product, and preventive means for excluding from the interface gases that are capable of causing oxidation of chrome, nickel or copper in the cladding member at the interface, the preventive means including a mass of scavenging metal arranged to scavenge oxidising gases at the interface.

Further according to the invention, there is provided a method of producing a ferrous product, including the steps of providing a billet comprising a body of solid steel, a cladding member that is comprised of an alloy selected from the group comprising stainless steel, nickel-chrome, nickel-copper and copper-nickel alloys and that is positioned so that there is an interface between the body and the cladding member, and preventive means for excluding from the interface gases that are capable of causing oxidation of chrome in the cladding member at the interface, the preventive means including a mass of scavenging metal arranged to scavenge oxidising gases at the interface, the method including the step of heating the billet in such manner that the scavenging metal is heated to a temperature at which it becomes active to scavenge oxidising gases at the interface before the alloy at the interface reaches a temperature at which oxides of chrome, nickel or copper can form, and working the billet so that the cladding member and the body become bonded together at the interface.

In one form of the invention the cladding member forms at least a part of a closed housing in which the body and the mass of scavenging metal are located and which prevents gases outside the billet from penetrating to the interface.

In one aspect of the invention the scavenging metal is selected from the group comprising aluminium, titanium, magnesium and an alloy of magnesium and aluminium.

In one form of the invention, the scavenging metal is comprised of aluminium, magnesium or an alloy thereof that melts before the billet reaches a temperature at which it is worked, and an element is provided that comprises a mass of finely divided steel located in the housing between the body and the mass of scavenging metal.

In another aspect of the invention, the cladding member forms at least part of a housing in which the body and the mass of scavenging metal are located, and an element is provided that comprises ammonium chloride or urea located in the housing between the steel body and the mass of scavenging metal.

In one aspect of the invention, the mass of scavenging metal comprises a first portion comprised of aluminium, magnesium or an alloy thereof and a second portion comprised of titanium.

In one aspect of the invention, the housing is comprised of a first part in which the body is located, and a second part in which the mass of scavenging metal is inserted before the two portions are joined together.

In one aspect of the invention, the mass of scavenging metal is located in a position that is separate from the interface.

The mass of scavenging metal is advantageously in the form of a briquette or similar element of compacted metal in finely divided form such as particles, granulate, ribbon, turnings or the like. Equally, the elements composed of steel, ammonium chloride and urea are also in the form of briquettes or similar compacts. The advantages of using a metal in such form rather than solid is that the ratio of surface area to weight thereof is increased, thus increasing the effectiveness of the metal to react with, or scavenge, any oxygen in the billet. If compressed to a high density, such briquettes are relatively impermeable to air or gases when cold. However, when they are heated up to below their melting point, they become porous and reactive to hot gases, thereby more effectively scavenging internal gases or air that enters the billet. They thus function as what may be called scavenging filters located in the billet in a position adjacent to parts of the cladding member and the steel body that become bonded together.

The invention further includes a ferrous product that is produced by a method, or from a billet, as described and claimed herein.

It is useful in this description to refer to the "free energy of oxide formation" (hereinafter FEOF). Useful discussions of this term are available on the Internet and elsewhere. In the present context, the FEOF provides a measure of whether, at any given temperature, the metal of which an element in the billet is composed, will be oxidised in preference to the chrome, nickel or copper in the cladding member and thus prevent oxidation thereof. A diagrammatic illustration of the FEOF of various metals appears in the Ellingham diagram for the reaction of metals to form oxides, also available on the Internet and elsewhere. On the Ellingham diagram it can readily be seen that metals that have a lower FEOF than chrome, nickel or copper up to the rolling temperatures of billets clad with any of the selected alloys of these metals include calcium (Ca), magnesium (Mg), lithium (Li), uranium (U), aluminium (Al), titanium (Ti), silicon (Si), vanadium (V), Zirconium (Zr) and manganese (Mn). Because of such considerations as danger in handling, radioactivity etc., many of these may not be useful for the purposes of the present invention except perhaps in specialised applications. Many of the named metals might also be too expensive to be economically useful. However, the applicant believes at present that magnesium, aluminium and titanium in particular, and also possibly lithium, could be industrially useful for manufacturing products according to the present invention. Use of the other named metals is not however necessarily discounted.

BRIEF DESCRIPTION OF THE DRAWING FIGURES

Figure 6:
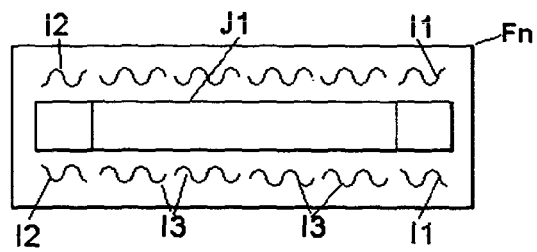
Figure 7:
Figure 8:
Figure 9:
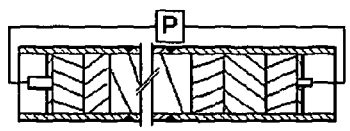
Figure 10:
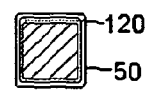
Figure 28:
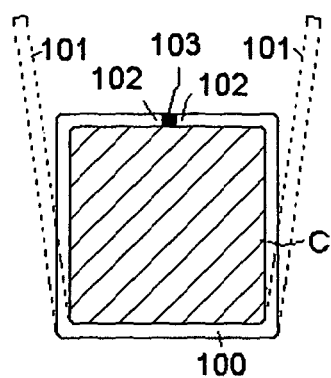

The invention is further discussed with reference to the accompanying drawings in which:

FIGS. 1 to 5, 11 and 12, and 14 to 24 show cross sectional views of one or both ends of a billet;

FIG. 6 is a schematic view of a heating arrangement for the billets;

FIGS. 7 and 8, 25 to 27, and 29 are cross sectional view of examples of products that can be produced from the billets FIGS. 9, 10 and 28 are cross sectional views of billets in the course of preparation.

DETAILED DESCRIPTION OF THE INVENTION

In the work carried out by the applicant up to the present time in connection with the development of the invention, the billets have been comprised of core bodies of carbon steel and a cladding of A304 SS and UNS S32101 and S32304 duplex stainless steels. The embodiments of the invention described herein are therefore focused on such billets. However, considering that nickel and copper have a higher FEOF than chrome, the applicant believes that the techniques of this invention can be successfully applied without significant modification to producing products comprising a steel core body that is clad with nickel-chrome, nickel-copper or copper-nickel alloys.

In the drawings, except as hereinafter explained, each billet B comprises a solid body or core C of carbon steel or any suitable grade of steel that is ordinarily more susceptible to corrosion than stainless steel. The core C is housed in a cladding member which, in the present examples, is in the form of a jacket J, that, in some cases, may comprise a central portion J1 that is composed of stainless steel and an outer portion 12 that is composed of mild steel. In other cases, the jacket may be entirely comprised of SS. The SS can be of any suitable grade, including ASTM 316, A304 or one of the stainless steels in the duplex range. There is thus in each billet a zone Z in which there is an interface between juxtaposed parts of the core C and the jacket that become bonded together when the billet is heated.

Each billet is provided with preventive means for excluding from the interface at zone Z gases that are capable of causing oxidation of chrome in the jacket J. The preventive means includes a mass comprised of at least one scavenging metal. The metal is usually but not essentially provided in the form of an element such as a briquette which is generically labeled E in the examples that follow and which is located in the jacket adjacent to at least one end of the core C and is thus displaced from the interface between the juxtaposed parts in zone Z.

In relation to the metals that make up the elements discussed herein, the abbreviation 'FD' refers to such metals in finely divided form including, as appropriate, turnings, ribbon, powder, wire and so-called wire wool, shot and grit, as well as swarf in the sense in which the latter term is commonly understood by those skilled in the art and as used in the earlier patents.

In the examples hereinafter discussed, a typical billet will be square in cross section and 150 mm×150 mm in cross sectional size and could be between 6 meters and 14 meters long. However, all of these dimensions are by way of example only and the billets could be of any suitable length and size. These might typically be determined by the length and size of commercially available bars and tubes that are used for the cores and jackets.

Various techniques are known, or have been suggested, for applying metal cladding to a steel core. Prior to being treated according to the methods disclosed herein, a billet may be prepared by any suitable such technique. In the present case, one or more plates, advantageously but not essentially of duplex SS, can be wrapped around a steel core bar and the abutting edges of the plates welded together. An example of such a billet is shown in cross section in FIG. 28 and is considered at present to be the optimum arrangement for preparing billets in a production situation and at the same time keeping capital expenditure on specialised plant to a minimum. Here, a square core C has been placed in a channel shaped member 100 of SS that has been bent or rolled beforehand from a single plate. Initially, the member 100 is in juxtaposition with three faces of the core. After placement of the core, the flanges 101 of the member 100 are bent around the fourth face of the core so that the edges 102 are in mutual abutment. These edges are welded together as indicated at 103. In a high production situation, a strip of SS can be fed from a coil through a conventional pipe mill which forms the strip into a channel shape having a profile that is essentially similar to that of the member 100. The bar is placed in the channel and the two flanges are folded around the bar and welded together in further stages in the pipe mill.

The core may also be inserted in a preformed SS tube by any suitable technique including, advantageously, one or other of the techniques disclosed in the specification that accompanies the international patent application filed pursuant to Australian provisional patent application no. 2009 905 130 and entitled "Billets for the Production of Metal Products".

Figure 2:
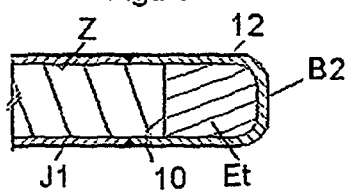

FIG. 1 shows one end of a billet B1 in which the ends of the jacket overlie the ends 10 of the core. A single element Et is placed against the end of the core. A plate 14 is located in the tube 12 against the outer end of the element Et and welded in place to seal the tube. In this example, the opposite end of the billet is similarly arranged so that the jacket J forms a closed metal housing in which the core and Et are located and which acts as a preventive means that excludes gases outside the billet from penetrating into the zone Z. These gases include furnace gases and atmospheric gases. In the present example, the element Et is composed of titanium (Ti) in any suitable FD form and compacted into a briquette prior to insertion in the billet. In FIG. 2, the plate 14 is not used. Instead, a preformed cap or dome is used. The cap can be fabricated by deep drawing from plate. The element Et is conveniently compacted or inserted in the cap prior to welding the cap to the end 12 of the jacket. Such a cap is less prone to failure during rolling than the welds on the end plate 14.

Referring to FIG. 6, the furnace Fn is provided with induction coils including a first set, indicated schematically at I1 and I2, that in a first stage quickly heat the ends of the billet until the element Et reaches a temperature of at least 500° C. and preferably 800° C. while the rest of the billet, and in particular the part comprising the stainless steel portion J1, remains below a temperature below which chrome oxides form in the surface of the jacket in the zone Z. Even at the lower temperature, the Ti bonds strongly with both nitrogen and oxygen, the principle gases of which air is composed, forming stable oxides and nitrides. The Ti thus actively scavenges these atmospheric gases from the zone Z to form their equivalent solid oxides and nitrides at each billet end, leaving only minute quantities of inert gases such as argon (Ar). Considering the amount of Ar normally present in the air, a partial vacuum, probably of around 19 mm Hg, results at this stage.

A second set of induction coils 13 are then activated together with the coils I1 and I2 to heat the whole billet to RT. During this phase, the heating of the carbon steel in the core causes it to decarburise. In the absence of the Ti, the carbon so released would react with any iron oxides on the surface of the core, initially forming $CO_2$ and then, at higher temperatures, CO together with some C. Both $CO_2$ and CO would be oxidising to the chrome in the SS. The Ti however has a lower FEOF than Cr so it is reducing to Cr. The Ti thus combines with any oxygen, including that from the iron oxide, and either prevents oxides of Cr forming or reduces any that have formed.

In this specification, any suggestion that oxidation is 'prevented' or 'reduced' is intended to imply that oxidation is prevented or reduced to the extent that the process results in a product that is industrially useful. Persons skilled in the art will recognise that it is probably impossible to expect that oxidation will be prevented or reduced in an absolute sense.

In an alternative arrangement, the elements Et can be heated by several high capacity gas- or oil fired burners that are located adjacent the main furnace in which the whole billet is subsequently heated. The main furnace may be an induction furnace as already described or may also be a gas- or oil fired furnace.

The heated billet B1 is taken to a mill for rolling into a long product such as a rebar shown in cross section at R in FIG. 7 or a flat bar F shown in FIG. 8. Clearly, products of other suitable shapes and sizes could be produced by the processes and from the billets disclosed herein.

Referring again to FIG. 1, as long as the jacket remains completely intact and therefore sealed against ingress of atmospheric air, there is no chance therefore that atmospheric air can enter the billet B1 through its ends as a result of the cooling that occurs when the billet is removed from the furnace. After the billet has passed through as many roll stands as are needed to ensure that the jacket is bonded to the core, the ends of the now more elongated billet incorporating the parts that house the remains of Et are cropped off.

One reason that Ti is selected for Et in this initial example is because it has a melting point that is higher than the RT. There is therefore no need to make any provision to keep it separate from the core as is the case with Al and Mg and some of the other metals that could be used, as discussed below. Notwithstanding the high melting point of Ti, the oxides that it forms in the billet are absorbed into the Ti metal so that the formation of further oxides is not inhibited. Unlike the case when Al and Mg are in the solid phase, Ti is thus able to react continuously with any oxygen that is formed in the billet while it is being heated. Ti therefore does not need to melt in order to function as an efficient oxygen scavenger. Furthermore, Ti is reactive even at low temperatures. As is the case with Al and Mg, dried and cleaned titanium turnings (suitable for briquetting) are readily available due to their high intrinsic value. This avoids the need for a scrap-processing plant to clean and dry swarf such as is required in the processes described in the earlier patents.

One advantage of the present process is that the core steel can be round, square, rectangular or of any other suitable shape. A billet with a core enables the process to be used with billets of any suitable cross sectional size and length. In particular, the billet size can be chosen to suit an existing rolling mill.

The core could also be a steel hollow preform and the billet used to produce a steel pipe having either an internal or external SS cladding. The ability to make rectangular billets enables them to be used to roll SS clad plates as well as long products. Examples of such products are discussed below with reference to FIGS. 25 to 27 as will be discussed.

To enable a steel core to be more easily fitted into a stainless steel jacket, the bar that is to be used for the core may first be mechanically ground. This would also have the result of descaling the bar. All bars that are commercially produced for the present purpose will need to be descaled, a process normally carried out by shot blasting. Such shot blasting would be unnecessary if the bar is ground.

In order to assist the removal of atmospheric oxygen from any of the billets described herein, it may be advantageous to evacuate the billet by connecting one or both ends of the billet to a vacuum pump P prior to any heating. This is shown schematically in FIG. 9. Before the billet is transferred to the furnace, the pump is disconnected from the billet, and the apertures in the billet by which the pump is connected are closed. The means of evacuating the billet in this way are well known and need not be described in detail.

Instead of evacuating the billet, or in addition thereto, the pump P could be of a type arranged to pump an inert gas such as Ar into the billet to displace the residual air.

Figure 3:
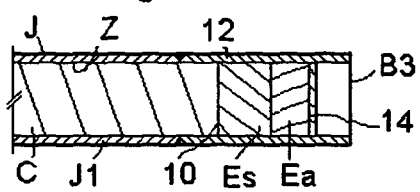

FIG. 3 shows another example of one end of a billet B3. The billet B3 and those still to be described, and the preparation and processing thereof into rolled products, will be discussed only insofar as they have features which differ significantly from those already described with reference to billet B1.

Two elements Es, Ea are inserted in each end of billet B3. Es is sandwiched between Ea and the end 10 of the core C. Es is a briquette that, in this example, comprises FD carbon steel but could alternatively comprise FD titanium. In either case Es could be formed by compressing the FD steel or Ti either directly into the tube 12 or into a briquette before it is pressed into the tube. Ea is similar to Et but is composed, not of Ti, but of FD aluminium (Al) or FD magnesium (Mg) or an alloy of these. It is convenient to discuss the properties of these three scavenging metals together. The scavenging function of each in the present process is similar to that of Ti in Et.

Of all of the metals named herein as being suitable for use in connection with the present invention, aluminium is the most widely available and the least expensive. It is perceived as being safe to handle. As noted in U.S. Pat. No. 6,706,416, it is an aggressive oxygen scavenger but, in the context of the present invention, its usefulness in this regard may be limited by the fact that its oxide, $Al_2O_3$, once formed, remains in the solid state on the surface of the Al metal and forms a barrier to scavenging. This barrier disappears when the metal melts at about 660° C. This temperature is easily achieved by induction pre-heating the end of the billet. This is one advantage of using Al. The boiling point (hereinafter "BP") of aluminium is well above RT and is thus too high to make aluminium in the gaseous state useful as an oxygen scavenger.

On the other hand, the melting point ("MP") of Mg is about 650° C. and its BP is about 1100° C. In addition, it is a more aggressive oxygen scavenger than Al. Mg is however commonly perceived as being unsafe to handle. This view is expressed in U.S. Pat. No. 6,706,416.

Contrary to this view however, information that has been provided by industrial suppliers of Mg suggests that, provided simple, easily achievable, safety steps are taken, the use of Mg for Ea, in the working conditions in which the present invention is put into practice, is unlikely to prove so hazardous as to render the use of Mg unacceptable. It appears that this will certainly be the case when the Mg is in the form of turnings or ribbon and is likely to be the case even when the Mg is in powder form.

Both aluminium and magnesium form stable oxides, nitrides, hydrides and carbides and, as noted, are active scavengers of atmospheric and other gases. They also have the advantage of low cost. In addition, Al and Mg turnings are widely available. They are most reactive on melting, at which point the surface oxide layers cease to inhibit their scavenging action. The FEOF of each is lower than that of titanium and of course much lower than that of Cr.

For a billet such as B3, there are some disadvantages to the use of an element Ea comprising Al or any of the other metals named herein, including Ti, that do not boil below RT. In this case, the gas pressure inside the billet at the commencement of rolling will be lower than atmospheric so that air would enter the billet if an end of the tube 12 was to fail before the jacket is bonded to the core during rolling or through pinhole leaks in the welding of plate 14. In this case however, oxygen in the air would still be scavenged by the elements Es and Ea and only atmospheric Ar would penetrate past the elements to the interior of the billet.

Conversely, a significant advantage of the use of Mg for Ea is that, when Mg is raised above its boiling point, a positive gas pressure is created inside the billet, replacing the partial vacuum that it creates in the billet as a result of forming solid oxides. Mg vaporises at 1100° C. at atmospheric pressure but at a lower temperature under the partial vacuum. At RTd the pressure of the vapourised Mg in the billet is close to atmospheric. At RTa the pressure of the vapourised Mg in the billet is above atmospheric. The possibility of entry of air during rolling if the jacket fails is thereby much diminished.

The vaporised Mg acts as a strong reducing gas for any CO and $CO_2$ that might occur in the billet. CO starts to form from about 780° C. and reduces Cr only at above 1225° C.

The element Ea may also comprise an alloy of aluminium and magnesium. As is known, the BP of such an alloy can be controlled by adjusting the proportions of the constituent metals. Thus the BP of the alloy can be made higher or lower than RT, as desired. One way of making use of this is discussed below.

Because Mg and Al melt at temperatures lower than RT, it is desirable to prevent molten Mg and/or Al, when used for Ea in billet B3, from reaching the interface of the core and the SS jacket. This is achieved by the presence of Es which, whether it is comprised of FD steel or Ti, does not melt below RT and acts as a barrier to the molten metal. This is one function of Es. If FD steel is used for Es, it is preferably of medium- to high-carbon grade, which typically contains 0.4%-1% of carbon. Graphite could be added to the FD steel to increase the carbon content if necessary. At elevated temperatures, CO will be evolving from the FD steel and any graphite present. At RTa, CO is reducing to any oxides in the chrome according to the Ellingham diagram. Even at RTd, CO may be reducing to Cr in the presence of Al or Ti.

When Es is formed from Ti, Es not only acts as a scavenger to oxygen that is initially present, or that evolves, inside the zone Z, but also helps to scavenge atmospheric oxygen before it gets into the zone Z through the welding or jacket failure as already noted.

Figure 4:
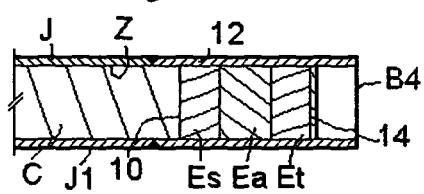

FIG. 4 shows the end of a billet B4 that comprises at each end an assembly of three elements Es, Ea and Et. Typically therefore, Es will be composed of FD steel, Ea will be composed of Al, Mg or an alloy thereof, and Et will be composed of FD Ti. In this assembly, the metal of which Ea is composed is thus molten at RTd as well as RTa. Es, Ea and Et in B4 serve the same respective functions as in B1 and B3 and therefore need not be further explained other than to point out that Et in B4 serves as a further means to scavenge oxygen, particularly from atmospheric air that may get into the billet in any of the ways previously described. The potential for oxidation of the Cr to occur as a result of such failure is exacerbated if the temperature of the interior of the billet and the incoming air is lower than 1225° C. The modification to the billet, shown in FIG. 11, addresses this problem.

Figure 11:
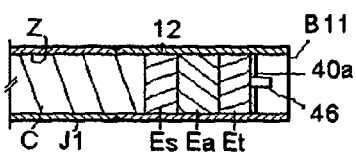

FIG. 11 shows one end of a billet B11 that is provided at each end with three elements Es, Ea and Et that, subject to what is said below about Ea, are comprised of the same metals, and serve the same functions as, the identically named elements in B4. The ends of B11 are initially sealed by plates 40a but each plate is provided with a temperature-dependent plug 46 that melts and allows the billet to be vented inside the furnace at a temperature which can be preselected but is in any case not less than 1225° C. A suitable material for such a plug is 30% copper-nickel which fully melts at 1237° C. When the plug melts, the vacuum conditions in the billet cause hot oxidising furnace gases, which are normally at temperatures of around 1300° C. and in any event well above 1225° C., to be rapidly sucked into the billet. These furnace gases would pass through Es, Ea and Et and thus through three layers of reducing and scavenging metals. First through the outer element Et which is composed of Ti, the scavenging effectiveness of which, as already noted, is not impaired by the formation of any oxide or nitride coatings as these are absorbed into the metal itself on heating above 500-800° C. The furnace gases then pass through Ea which, if composed of Al and thus melting at around 650° C., is retained between Es and Et. Ea can also be composed of an alloy of Al and Mg to provide an even more powerful scavenging action. Any remaining oxygen or CO2 when passing through the final element Es is converted into CO. This is accompanied by an increase in pressure due to the formation of two CO molecules for every molecule of $CO_2$ or $O_2$. The CO entering the zone Z at temperatures well above 1225° C. will have a reducing effect on any Cr oxide traces still present at the interface.

The three elements pressed into each end of billet B11 also provide additional protection as a precaution against the occurrence of oxidation in the core and jacket in the zone Z in the event of failure of the jacket ends during rolling. The elements therefore serve a dual purpose as CO converters when the plug melts and if the ends of the jacket should fail during rolling.

The fact that a relatively large initial gap 50 can be left between the steel core and the jacket would enable agents such as powdered Al or $NH_4Cl$ to be sprinkled on the top of the core C as it is being inserted in the jacket J1. This is illustrated schematically at 120 in FIG. 10.

Figure 12:
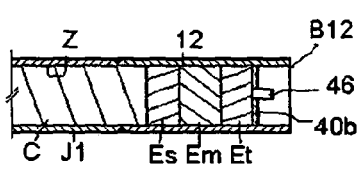

FIG. 12 shows one end of a billet B12 that is a variation of billet B11 and is provided with three elements Es (or Et), Em and Et. The middle element Em would be composed of Mg. The outer element Et would again be composed of Ti. Here, the billet again vents through a temperature-dependent plug 46 as already described whilst in the furnace. In this example, reliance is placed on Mg vapour to be present inside the billet before and during rolling.

It is convenient first to consider Em as being composed of pure Mg. As with all of the other billets shown in the drawings, the ends of billet B12 are first heated up rapidly, until the Mg in Em becomes molten. In essence, the Mg ignites as it reaches melting point, rapidly scavenging all of the $N_2$, $O_2$, $CO_2$ and CO creating a vacuum in the billet. At this stage the entire billet is heated to RTa or RTd. The Mg vaporises at 850° C. due to the vacuum. The Mg vapour increases in pressure with further rising temperature, generating a positive pressure.

As in the previous example, the billet vents whilst still in the furnace by the provision of the plug 46 of copper-nickel which is designed to melt close to either RTa or RTd as required. Copper-nickel 10% fully melts at 1145° C., above the boiling point of Mg. The positive pressure provided by the Mg vapour prevents the entry of furnace gases as well as preventing the ingress of air, once removed from the furnace for rolling.

It may alternatively be advantageous to design the end compartments to vent or break during initial rolling and allow the Mg vapour to escape. Being under pressure, this would help to prevent the entry of air until the jacket and core are bonded.

The ratio of Al to Mg could be chosen to cause the alloy to vaporise anywhere between 850° C. and 1260° C. In essence, this process relies on the Mg vapour, rather than CO, to reduce Cr oxides.

It may prove unacceptable in practice to use elements composed of a metal such as magnesium or an alloy thereof that vaporises below RT of the billet concerned, because the vapour that penetrates into the zone Z may leave unacceptable inclusions at the interface in the finished product. On the other hand, the same elements may be acceptable for use in billets whose RT is below the temperature at which the elements vaporise. Experience will determine the circumstances in which such elements can be used.

In the course of tests carried out in connection with the present invention, it has been observed, surprisingly, that the ends of billets prepared as shown in FIG. 3 and passed through a particular conventional pusher type furnace have become adequately heated (for the purposes of the invention) before the centre parts without special arrangements being made in the furnace for preheating the ends. The reason for this is not entirely clear but it may be due to any one of several factors or perhaps a combination thereof. In most pusher type furnaces the billets are placed on the furnace floor and eventually exit when they are hottest. The furnace gases can heat the billets only through their top faces and their two end faces since other faces of the billets are not exposed to the furnace gases. The top faces of the billets together however present as a continuous flat mass of steel which acts as a heat sink. The ends therefore heat up more quickly than the central parts of the billets, which initially remain relatively cool. In addition, the heat conductivity of both Ti and Al, as well as Mg, is much greater than that of steel or SS.

The rolling sequence can be arranged so that gas flows in a controlled manner through the billet. For example, where an in-line rolling mill is used, the end of the billet that enters the rolls can be closed and the back end designed to vent during rolling. Mg vapour and other gases will be pushed towards the vent at all times under considerable pressure, thereby also serving to flush out any minute quantities of solid Mg oxides and/or nitrides that have not already been driven into the end compartments. This technique ensures that all Mg vapour has been expelled at over 1100° C. before it cools below its BP. If this was to happen, the oxides and nitrides might remain in the billet as solid, non-metallic inclusions.

In what follows, it is not considered necessary to repeat in every instance the description of the elements or some arrangements thereof specifically and such elements may be identified by the simple letter E.

Notwithstanding that a billet contains elements comprising the metals, particularly aluminium and titanium, that have so far been suggested, it is possible that, after the ends are preheated, conditions in the interior of the billet may still allow some oxidation of the Cr, despite the fact that the atmospheric air has been scavenged or evacuated from the billet prior to heating.

Figure 5:
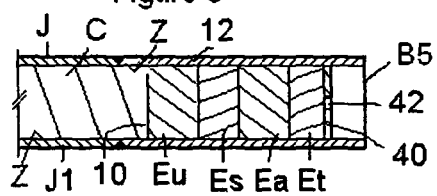

FIG. 5 shows the end of a billet B5 that addresses this issue. B5 comprises an assembly of four elements Eu, Es, Ea and Et. The latter three can be identical to those already described and serve the same respective functions. The plate 14 can be omitted or, alternatively, a plate 40 with a vent hole 42 may be provided to help hold the elements in place during rolling. Eu is sandwiched between Es and the end 10 of the core and is a briquette comprising $NH_4Cl$ or urea. The usefulness of this assembly is that the $NH_4Cl$ or urea dissociates at a low temperature, as described in the earlier patents, and forms large volumes of gas that are able to escape from the billet through vent hole 42, since Es, Ea and Et can be made sufficiently porous to allow this to happen. These gases displace residual air in zone Z of the billet. The dissociation of $NH_4Cl$ or urea commences at a temperature below 200° C. and continues until the temperature reaches somewhere below 600° C. at which point the $NH_4Cl$ or urea are spent and the flow of gases out of the ends of the billet ceases. The billet B5 does not therefore need to be evacuated or purged to remove the atmospheric gases inside the billet. Although the porosity of Es, Ea and Et also allows atmospheric air to be drawn into the billet when the ends are being heated, Es, Et and the molten constituents of Ea scavenge any oxygen that may remain, or evolve, in the billet and also scavenge oxygen and other gases in the air before they can penetrate into the interior of the billet.

Figure 13:
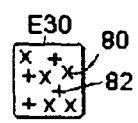

A modified element E30 is shown in FIG. 13. This element comprises Ti in a suitable FD form such as shavings shown schematically at 80, mixed with carbon steel, also in the form of wire or swarf or other suitable FD form as shown schematically at 82.

In the billets B1-B4, the jacket J that houses the core body and is closed to the atmosphere provides means for preventing oxidising gases from outside the billet penetrating the zone Z until the interfacing parts of the core and SS jacket become bonded together. In a billet such as B5, this means is effectively provided by the element Eu in combination with an array of scavenging elements such as Es, Ea and Et. Eu is active in the lower temperature ranges to scour oxidising gases from the zone Z and the scavenging elements not only allow these gases to escape but also provide a sufficient sealing action at the lower temperatures to stop atmospheric or furnace gases from penetrating to the zone Z. As the temperature rises, the scavenging elements become more active and, although atmospheric and furnace gases may be able to penetrate to the zone Z, any oxygen in these gases is scavenged by Es, Ea and Et before they do so. The elements also act to scavenge oxidising gases that evolve in the zone Z until the interfacing parts become bonded together.

It may be found unnecessary to provide as many as three scavenging elements in a billet such as B4. For example, the element Et may be active enough to allow the middle element Ea to be omitted. Since Et does not melt, the barrier element Es may also not then be needed.

The elements might typically be 10-150 mm thick. This is however by way of example and they could be of any suitable thickness.

It will probably always be necessary to prevent the raw scavenging metals from the elements E being present in the zone Z before the billet is heated. The residue of any significant quantity of these metals is likely to be deleterious to bonding between the faces of the core and jacket and the parts of the billet that contain such residue after rolling are in any case discarded. It is therefore thought that the scavenging elements E should initially be located in a position that is separate from the faces of the core and jacket. In this regard, a mass of any of the FD scavenging metals, particularly Ti, could be mixed with FD steel and inserted, advantageously in briquette form in the billet ends. The FD steel would serve as a matrix to hold the scavenging metal in place.

When a preformed tube is used for the centre part J1 of the jacket, the core must be smaller than the jacket to allow the core to enter the jacket. The billet of 14 m length with a 150 mm×150 mm jacket J1 of 7 mm wall thickness, as exemplified herein would house a 122 mm×122 mm square steel core. In this example, at room temperature, there would be a 14 mm gap between the core and the jacket. This gap would represent some 50 l of atmospheric air, i.e. 78% nitrogen and 21% oxygen.

On a gram molecular basis: 1 gm of Mg could scavenge 320 cc of free air;

1 gm of Ti could scavenge 250 cc of air; and 1 gm of Al could scavenge 480 cc of air.

In a sealed billet containing 50 l of air, only 104 gm Al would therefore be required to create a partial vacuum to leave 1% Ar. Similarly 156 gm of Mg or 200 gm of Ti would be required to scavenge the 50 l of air from a billet of the same size and leave the same partial vacuum. However in the case of a billet of the same size with open ends, 5000 l of internal air and/or external atmospheric air would have to be scavenged in order to create 50 l of Ar inside the billet as described above; i.e. 50,000 cc/0.01=5,000,000 cc.

The following calculations are provided for the purposes of illustration and assume that a billet such as B4 is to be produced. It is also assumed that the element Ea is made up of aluminium, this being the metal that is most to be used in industrial practice. Al has a density of 2.7 g/cc. Roughly 10.4 kg of FD aluminium (on a weight basis) would be required, or about 5.2 kg at either end. This represents 0.5% by weight of the total billet weight of 2000 kg. Aluminium briquettes with relative densities of 70% of solid aluminium would weigh 5.2 kg each and have a length of 170 mm to fit tightly into each end of a jacket having internal dimensions of 136 mm×136 mm.

Inside and outside gas pressure equilibrium is eventually reached when the interior of the billet is filled with Ar. Any displacement of the pressure equilibrium that occurs as a result of the expansion or contraction of gases in the billet as the furnace heats up to RT or variations in furnace temperature, would adjust automatically. The elements E at each end thus provide a self-regulating mechanism for the pressure equilibrium.

There are other metals that have a lower FEOF than Cr and that therefore might be used instead of Al, Mg or Ti. Although it appears at present that these other metals are less likely to be used, this is not discounted. These other metals include zirconium, lithium, calcium, silicon, vanadium, manganese and uranium.

Figure 14:
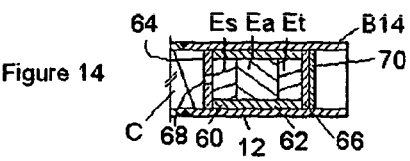
Figure 14A:
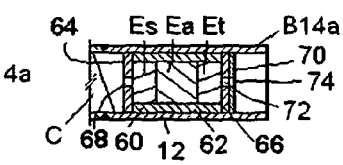

Yet another possibility is illustrated in FIG. 14. The billet B14 contains one or more elements in substantially the same arrangements as any heretofore described. However, the elements are not placed directly in the jacket ends but are pre-packed instead in a cartridge 60 of mild steel. In this example, three such elements Es, Ea, Et are illustrated which are identical to those previously described. The cartridge is a close fit in the tube 12 and comprises a longitudinally extending, tubular outer body 62 with end plates 64, 66 at its inner and outer ends. The end plates are welded to, or integral with, the body 62 so that the joints between the plates and body 62 are sealed. The end plate 64 is located against the end of the core C and is provided with a central aperture 68. After the cartridge is inserted in the billet end, it is fixed in place by a plate 70 welded to the tube 12. The function of the plate 70 is similar to that of the plate 14 so that, as necessary and depending on the nature of the element or elements E inserted in the cartridge, the plate 70 may have an aperture or may be provided with a plug that melts at a predetermined temperature or alternatively (as shown) may have no aperture, all as previously described. In the first two of these cases, the end plate 66 will be provided with an aperture 72 (as shown in FIG. 14a) that is aligned with the aperture 74 in the plate 70 and is similar to the aperture 68 in the end plate 64. The inner end plate 64 serves, in the first place to hold the element or elements in place in the cartridge. It is one aspect of the invention that the elements E, in any of the arrangements described herein, can be packed into cartridges and transported separately from the billets. This could have the result that simpler machinery might be required for assembling the billets. Where one of the elements E that is inserted in the cartridge is composed of a scavenging metal that melts below RT as previously described, each end plate 64, 66 also acts as a barrier for holding the molten metal. The quantity of metal could be chosen so that, when molten, its upper surface lies below the apertures 68, 72, 74. This would help prevent molten Al or other metal from spilling out of the cartridge and finding its way into the gap between the core and the jacket when the hot billet is being handled.

Figure 15:
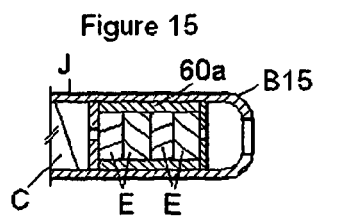
Figure 16:
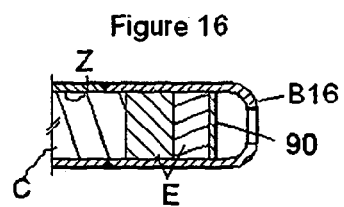

By using the multiple elements as described herein with a billet comprising a core of solid steel, it may be possible to avoid the expense of closing the ends of the jacket J from the atmosphere. It may be sufficient merely to close the billets by crimping the ends as described in the earlier patents. FIGS. 15 and 16 show the ends of billets B15, B16 crimped in this way. Both of these billets contain elements E as already described. In the case of the billet B15, the elements are contained in a cartridge 60a, similar to that already described. In the case of the billet B16, the cartridge is not used and the elements are inserted directly in the end of the billet before is it crimped. In this case it may be necessary to insert a carbon steel plate 90 in the billet end before it is crimped. The plate 90 is not provided to close the jacket and so is not welded in place. The plate 90 may help to prevent the elements E from being crushed by the pipe 12 during crimping.

Figure 15A:
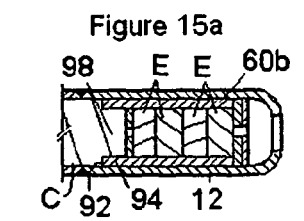

FIG. 15a shows that the end 98 of the core C can be provided with a peripheral recess 92 that accommodates the end 98 of the body of the cartridge 60b. This would tend to promote welding of the cartridge end to the core end when rolling is commenced and thereby help to prevent the cartridge becoming separated from the core and the consequent possible failure of the jacket at the junction between the core and the cartridge.

Figure 17:
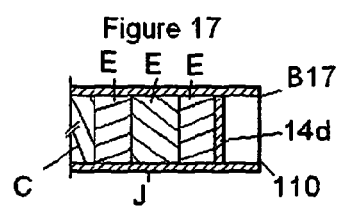
Figure 18:
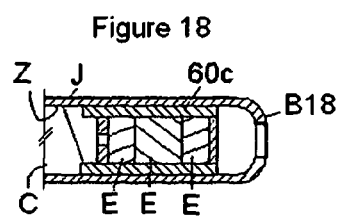

In any of the foregoing examples, it may be preferable to omit the use of carbon steel pipe ends 12 welded to the SS jacket. Instead, the elements E are inserted in the ends of the SS jacket, which is made longer for the purpose. A billet B17 so made is shown in FIG. 17, the SS jacket J extending beyond the plate 14d to the end 110 of the billet. FIG. 18 shows one end of a billet B18 in which a cartridge 60c is inserted in the end of a SS jacket J. As in the case of the billets B15 and B16, the end of the jacket can be crimped over the cartridge (as shown) or closed by a plate.

In the case of the billets B17 and B18, relatively large proportions of the SS jackets J will be wasted as a result of the fact that the ends are cut off after the billet is rolled. The expense of this may be reduced by providing a billet B19 or B20 (respectively shown in FIGS. 19, 20) in both of which, in the first place, the end of the core C is located close to the end of the jacket J and is provided with a peripheral recess 92d, 92e respectively similar to the recess 92. Again, no carbon steel tube is welded to the end of the SS jacket. Instead, cartridges 60d, 60e respectively are provided. These are similar to the cartridge 60b in that the bodies of both have identical inner ends 94d, 94e, each of which is accommodated in a respective recess 92d, 92e and is fillet welded to the jacket J. However, the bulk of each cartridge 60d, 60e is located outside, and projects clear of the end of, the jacket J. It may be noted that, in these examples, the outer end of each cartridge is closed and the billet is thus closed to the furnace gases and the outside atmosphere.

In the billet B19, the body of the cartridge is formed by a cylindrical pipe the cross sectional size of which is substantially equal to that of the core C. The end of the pipe is closed by a plate 66d welded in place. In the billet B20, the body of the cartridge is cup-shaped. The body can be formed by deep drawing. The provision of a welded-on end plate is thus avoided. In the case of a jacket that is made up of a square pipe, the part of the cartridge that projects clear of the jacket and core must be smaller than the square pipe so as to permit the cartridge to enter the guides of the rolling mill. These guides will have been shaped to precisely guide the entry of the (square) billet and will allow any smaller shapes to enter the guides and thereafter enter the rolls.

Figure 19:
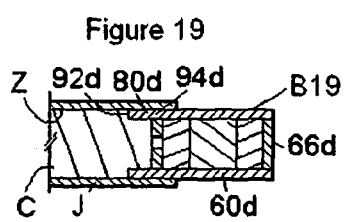
Figure 20:
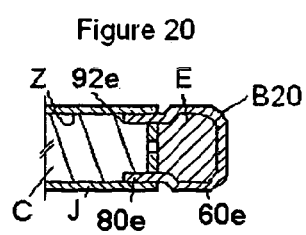

One advantage of using a cartridge of the type as shown in FIGS. 19 and 20 is that a portion 80d, 80e of the inner end of the cartridge projects into the billet and is sandwiched between the end of the jacket and the end of the core. The joint between the cartridge and billet may therefore be less likely to cool and crack during the rolling process. Furthermore, this type of joint may be structurally stronger as pressure welding between cartridge, core and SS jacket occurs during rolling thus serving as a back-up connection system in case of failure of the outer weld.

Figure 21A:
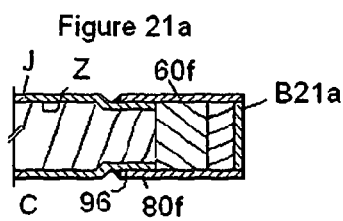
Figure 21B:
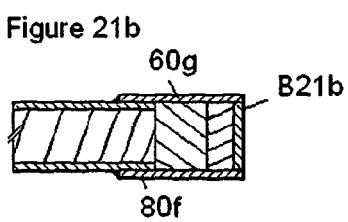

Further variation of the billets B19, B20 are shown in FIGS. 21a and 21b. In FIG. 21a, a portion 96 of the billet that comprises the ends of the core and jacket J and that might typically be 50 mm long, is swaged down so that its overall cross sectional size is less than, or at most equal to, the original cross sectional size of the core. For this purpose, a swaging machine can be used that is of the type commonly used for swaging metal fittings onto the ends of flexible hydraulic hoses. Such machines typically have four or eight concentrically actuated closing and opening jaws. A cartridge 60f is provided the inner end 80f of which fits snugly over the outside of the swaged down portion 96 of the jacket and core. The cartridge 60f, which can have the same outer dimensions as the original jacket and can be closed by a welded-on plate as in FIG. 19 or cup-shaped as in FIG. 20, is fillet welded onto the jacket. A cartridge of this design also helps to protect the portion of the jacket end that projects into the cartridge from excessive heat loss during rolling.

In FIG. 21b, the cartridge 60g is of larger cross sectional size than cartridge 60f but is otherwise identical. The cartridge 60f has a skirt that fits over the end portion of the billet B21b, which is not swaged down.

In all cases the cartridge can be formed of carbon steel which is less prone to cracking than SS if the cartridge cools excessively during rolling.

The cores and jackets of the billets heretofore described and shown in the drawings are typically, but not essentially, of square cross sectional shape. This is because it is thought that it will be most practical to form a square shaped core with the requisite degree of longitudinal straightness and uniformity of cross sectional dimensions. Clearly, however, billets of other cross sectional shapes (including round and rectangular shapes) may be used.

FIG. 22 shows a billet B22 comprising a hollow block of steel 110 that comprises a round passage 111 in which a SS tube 112 is inserted. The ends 113 of the tube project clear of the block. An array of annular elements E arranged similarly to any that have been heretofore described, are mounted over each end 113 and are housed in a closed steel casing 114 that is also annular and is welded to the end face of the block. The elements prevent oxidation of the zone Z at the interface between the tube and block in the passage 111. The billet B22 is suitable for producing an internally SS clad, seamless steel pipe 115 shown in FIG. 25 by a known piercing and rolling technique. The steel body of the pipe and the cladding are shown at 110' and 112' respectively.

FIG. 23 shows a billet B23 that is similar to B22 except that the steel block 110a is housed in a SS tube 112a. Again, B23 is suitable for producing an externally SS cladded, seamless steel pipe 115a shown in FIG. 26. The steel body of the pipe and the cladding are shown at 110" and 112" respectively.

FIG. 24 shows a billet B24 that comprises a rectangular steel slab 116 to the upper face 118 of which a SS plate 119 is applied. The plate is preformed with each of its four edges being folded downwardly at 90° to the face 118 to form flanges two of which are located at the front and back ends of the billet and are shown at 120. The remaining two flanges (which are not visible in the drawing) are welded to the side edges of the plate. After the plate 119 has been placed in this position, the visible flanges are again folded inwardly as shown at 121 so that the free edges of these flanges are respectively positioned for welding to the lower face 122 of the plate at the front and back edges thereof. The visible flanges 120 enclose arrays of elements E arranged similarly to any that have been heretofore described. The billet B24 should be suitable to be heated and rolled into a steel plate 123 shown in FIG. 27 having one face clad with SS. The steel body of the plate and the cladding are shown at 118' and 119' respectively.

Figure 29:
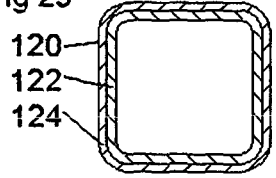

FIG. 29 shows a product in the form of square, externally SS clad pipe 120 comprising a steel body 122 that, in this case, is tubular and is bonded to a SS cladding tube 124. The pipe could be produced from a billet that is assembled in essence similarly to the billet B23, due allowance being made for the differences in dimensions and shape of all of the components.

FIG. 29 could equally be viewed as an internally SS-clad pipe 120 comprising a steel body 124 bonded to an inner cladding tube 122. This pipe 120 could be produced from a billet that is assembled in essence similarly to the billet B22, due allowance again being made for the differences in dimensions and shape of the components.

In a first trial, four billets were prepared, each comprising square core bar of carbon steel with outside dimensions of 100 mm×100 mm and 2 m long. Two cladding plates were provided for each bar. For two of the billets, the plates were of 6 mm thick UNS S32101 duplex SS and for the other two billets the plates were of UNS S32304 duplex SS, also 6 mm thick. Each plate was preformed into a U shape having a base and two upstanding flanges that closely covered half of the bar. The plates were applied to opposed sides of the bar so that there were welding gaps between the abutting edges of the plates that extended along the centrelines of opposed faces of the bar. The plates were welded together along the abutting edges without the welds penetrating to the core bar to form a SS casing around the bar.

Cartridges 170 mm long were prepared. These contained three elements composed respectively of compacted masses of Ti turnings, Al turnings and carbon steel turnings, each approximately 35 mm long. The three elements were pressed into a carbon steel casing fabricated from 8 mm thick carbon steel plate as exemplified in the billet B19. One such cartridge was welded to the cladding plates at each end of the billet, again as exemplified in the billet B19. Each billet was thus closed to the atmosphere.

The ends of each billet were preheated to around 800° C. leaving the central part of the billet at ambient temperature. After this the entire billets were heated in a rolling mill furnace to 1200° C.

The billets were then rolled through the first six roughing passes of a conventional rolling mill in a diamond-square roll pass configuration. In this procedure, the billets were reduced in size to 70 mm×70 mm and the partially rolled product was sectioned and examined. In all billets, there was no sign of significant oxidation in the SS casing at the interface with the core bar at a distance of more than 50 mm from the billet ends. Furthermore, there appeared to be complete bonding between the core bar and the casing at the interface. No finning was observed which would have resulted from de-bonding of the SS casing from the core bar into the roll gaps. In commercial production, the ends of the billets containing the remnants of the end pieces would be cropped off as soon as bonding is known by experience to be complete. In the present case, it was therefore concluded that, in practice, the ends could be safely cropped off after the sixth pass.

In a further trial, two commercially produced carbon steel core bars 84 mm×84 mm in size and 2 m long were descaled. The bars were inserted into square tubes, also commercially produced, of ASTM A 304 grade SS 100 mm×100 mm in outside size and 6 mm wall thickness. Initially, there was thus a nominal clearance gap of 4 mm between the core bar and the tube. After insertion of the bars, the tubes were stretched beyond the elastic limit of the SS to result in a 12% elongation of the tube. In this procedure, the tube was shrunk tightly over the core bar to the point that the rounded corners of the tube distorted to adapt to the different radii of curvature of the core bar. The tube became longer than the core bar and shrank to a size of 91 mm×91 mm at its projecting ends where they were not restrained by the core bar.

After the stretching procedure, tubular carbon steel end pieces 70 mm long were welded to the ends of the SS casing using the same Inertfil 309™ welding wire. A single element 35 mm long and composed of a compacted mass of Ti turnings was pressed into each end piece before a closing plate was inserted in the end piece and welded thereto as exemplified in billet B1.

The billets were rolled using the same procedure as for the first four billets with the same results.

In conclusion the processes of the present invention enable the production of products that have a cladding of ferritic, duplex or austenitic SS or a nickel-chrome, nickel-copper or copper-nickel alloy. These new products can be made compatible with modern rolling mills, including those that employ induction heating. The new cladding technology should reduce the capital costs including the cost of specialist plant that is required to make and roll the billets. Overall, it should be easier for the new process to be adopted internationally.

The invention claimed is:

1. A billet comprising:
a solid steel body;
a cladding member comprising an alloy selected from the group consisting of stainless steel, nickel-chrome, nickel-copper and copper-nickel alloys;
an interface between at least a portion of the solid steel body and at least a portion of the cladding member; and
a scavenging metal in the billet at a position that is separate from the interface,
wherein the billet is sealed and configured so that, upon heating, the scavenging metal scavenges oxygen initially present in the billet, and the billet is adapted to be worked to form a ferrous product in which at least said portion of the solid steel body and at least said portion of the cladding member are bonded together at the interface.

2. The billet according to claim 1, in which the cladding member forms at least a part of a sealed housing in which the solid steel body and the scavenging metal are enclosed.

3. The billet according to claim 2, in which the housing is comprised of a first part in which the body is located, and a second part in which the mass of scavenging metal is inserted before the two parts are joined together.

4. The billet according to claim 2, in which the scavenging metal is selected from the group consisting of aluminum, titanium, magnesium and an alloy of magnesium and aluminum.

5. The billet according to claim 1, in which the scavenging metal is selected from the group consisting of aluminum, titanium, magnesium and an alloy of magnesium and aluminum.

6. The billet according to claim 1, in which the scavenging metal comprises a first portion comprised of aluminum, magnesium or an alloy thereof and a second portion comprised of titanium.

7. The billet according to claim 1, in which the alloy of which the cladding member is stainless steel.

8. A ferrous product produced by heating and working a billet as claimed in claim 1.

9. The billet according to claim 1, wherein the billet is configured so that the scavenging metal is heated to scavenge said oxygen while the cladding member remains at ambient temperature.

10. The billet according to claim 1, wherein the billet is configured so that, when the billet is placed in a furnace, the scavenging metal is heated to scavenge said oxygen before the alloy reaches a temperature at which said oxidation occurs.

11. The billet according to claim 1, wherein the scavenging metal is located adjacent at least one end of the solid steel body.

12. The billet according to claim 1, wherein the cladding member is comprised of at least two parts which are joined together to form a sealed housing in which the solid steel body and the scavenging metal are enclosed.

13. The billet according to claim 1, wherein, upon heating, the scavenging metal scavenges nitrogen initially present in the billet before the billet is worked.

14. A method of working a billet comprising:
a solid steel body;
a cladding member at least a portion of which is comprised of an alloy selected from the group consisting of stainless steel, nickel-chrome, nickel-copper and copper-nickel alloys;
an interface between at least a portion of the solid steel body and said portion of the cladding member; and
scavenging metal in the billet a position that is separate from the interface,
the method comprising:
sealing the billet;
causing the scavenging metal to be heated so that the scavenging metal scavenges oxygen initially present in the billet, and working the billet to form a ferrous product in which said portion of the solid steel body and said portion of the cladding member are bonded together at the interface.

15. A ferrous product produced by a method as claimed in claim 14.

16. The method according to claim 14, wherein the scavenging metal is selected from the group consisting of aluminum, titanium, magnesium and an alloy of magnesium and aluminum.

17. The method according to claim 14, wherein the scavenging metal is heated to cause said oxygen to be scavenged while the cladding member remains at ambient temperature.

18. The method according to claim 14, wherein the billet is placed in a furnace and the scavenging metal is heated to cause said oxygen to be scavenged before the alloy reaches a temperature at which said oxidation occurs.

19. The method according to claim 14, wherein the cladding member forms at least a part of a sealed housing in which the solid steel body and the scavenging metal are enclosed.

20. The method according to claim 14, wherein the scavenging metal is located adjacent at least one end of the solid steel body.

21. The method according to claim 14, wherein the cladding member is comprised of at least two parts which are joined together to form a sealed housing in which the solid steel body and the scavenging metal are enclosed.

22. The method according to claim 14, wherein, upon being heated, the scavenging metal scavenges nitrogen initially present in the billet before the billet is worked.

23. The method according to claim 14, wherein the scavenging metal comprises a first portion comprised of aluminum, magnesium or an alloy thereof and a second portion comprised of titanium.

\* \* \* \* \*